May 9, 1967  J. B. BEHRENDT ETAL  3,318,151
AUTOMATIC TEMPERATURE RECORDER FOR VEHICLE EXHAUST
MANIFOLD AND METHOD OF USING SAME
Filed Feb. 27, 1961
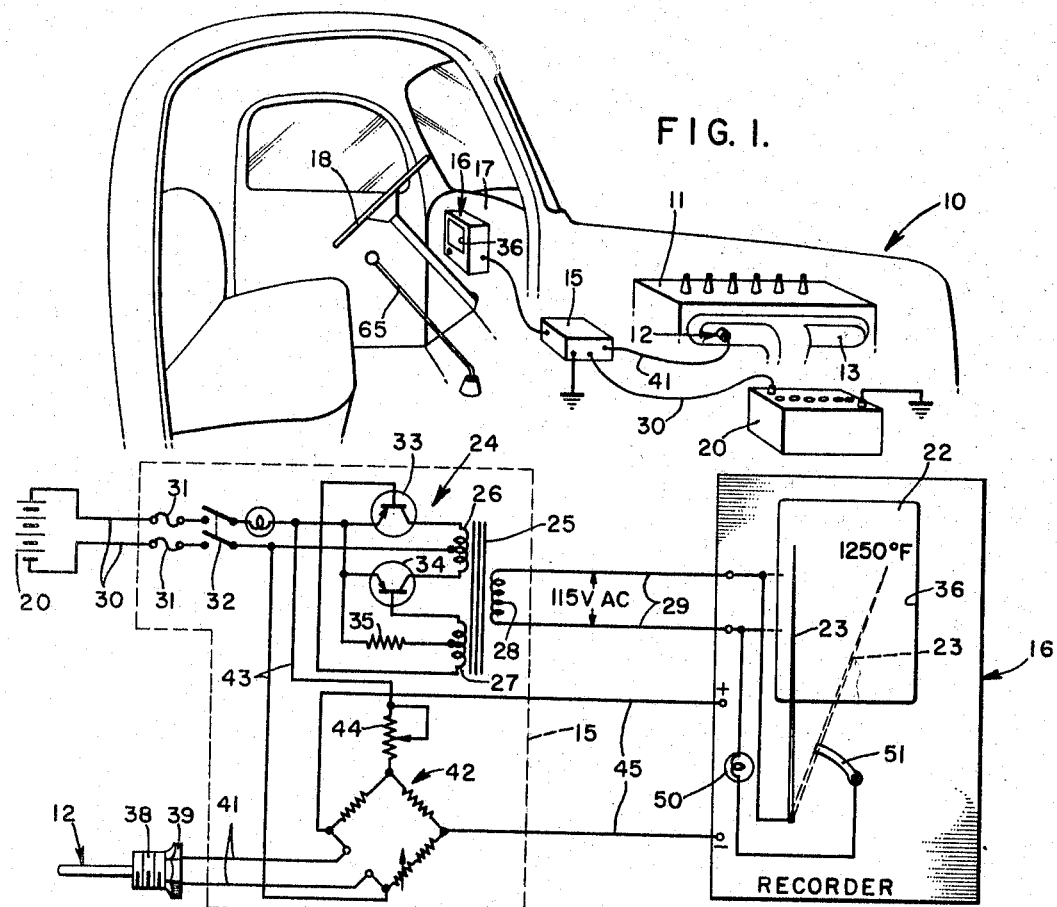
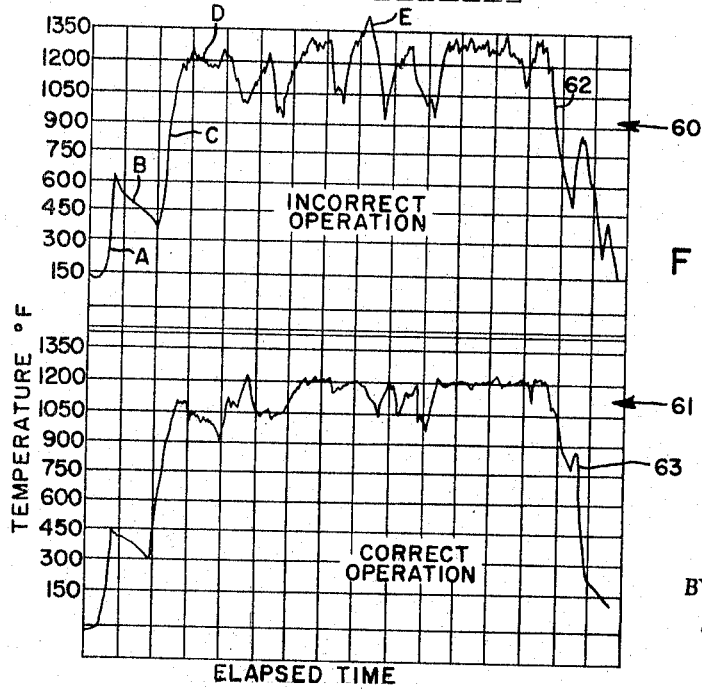
JACK B. BEHRENDT
CHARLES L. HESS
HENRY R. BERGQUIST
INVENTORS.
BY
ATTORNEY.

3,318,151
AUTOMATIC TEMPERATURE RECORDER FOR VEHICLE EXHAUST MANIFOLD AND METHOD OF USING SAME
Jack B. Behrendt, 2113 Trudie Drive, San Pedro, Calif. 90732; Charles L. Hess, 3307 W. 116th St., Inglewood, Calif. 90303, and Henry R. Bergquist, Los Alimitos, Calif.; said Bergquist assignor to said Behrendt and said Hess
Filed Feb. 27, 1961, Ser. No. 91,755
6 Claims. (Cl. 73—346)

This invention relates to automatic monitoring equipment and more particularly to an automatic monitoring apparatus for providing a graphic record of an engine operating condition visually observable by the operator and enabling him to operate the engine under most advantageous and efficient operating conditions. The monitoring apparatus also features means for signaling the operator if he fails to take timely corrective action should such need go unheeded.

Although the present invention will be discussed with reference to a particular operating environment, namely, trucking vehicles, it will be understood that this application of the invention is merely typical of many others having need for operating an internal combustion engine under varying load conditions. As respects cargo trucks, it has long been known that service and maintenance costs as well as operating expenditures vary over a wide range owing to the very serious problems involved in obtaining compliance by the truck operator with proper operating techniques and procedures. Even when this is done with all reasonable fidelity, the radically varying operating conditions including ambient temperatures, variations in loading and in highway grades, to mention but a few typical factors, are such that it is quite impossible in practice to provide adequate operator instructions for always safeguarding the engine while permitting profitable operation of the truck. An insight into the difficulties involved is to be gained from the fact that the existence of excessive engine temperatures in certain critical areas of no more than thirty seconds duration can greatly shorten the life of the engine and necessitate costly engine overhaul far in advance of normal practice requirements.

Since many truck engines are designed for most efficient and effective operation when running at 400 r.p.m., it has been commonplace to equip them with transmissions having 12 to 15 shift positions. However, no satisfactory means has so far been provided enabling the operator to know when it is desirable to shift gears to permit operating the vehicle at an optimum speed without risk of overheating the engine. It is known that to permit engine temperature at some selected critical point to rise above a predetermined value is certain to involve inefficiencies and more particularly serious risk of damage to the engine or some of its components. Temperature conditions at the exhaust gas manifold are a particularly sensitive and positive indicator of safe and unsafe engine operations. The critical operating temperature of the exhaust gas manifold for present day heavy duty motors ranges between 1000 and 1400 degrees F. For many engines the critical temperature is in the neighborhood of 1200 to 1300 degrees F. Under no circumstances should the temperature by permitted to remain above the critical value for more than a few seconds else there is grave risk of costly damage to the valves, the valve seats, the pistons, the lubrication system, to name but a few of numerous temperature-sensitive components.

Extensive tests under action operating conditions have established most persuasively that the service life of an engine can be increased two and three times and that service and maintenance costs, as well as fuel and lubricating costs, can be markedly reduced if the exhaust gas manifold temperature is kept below the known critical temperature characteristic of that engine.

Although these controlling criteria have been known for sometime, prior devices provided in attempts to assure the application of optimum operating techniques by the driver have not been successful. Various monitoring and policing devices have been proposed and put to use but all are subject to serious defects and shortcomings sought to be avoided by this invention. For example, tachometers are commonly applied to the engine to apprise the driver of the engine operating speed at all times and with the view to having him operate the shift control equipment as necessary to keep the engine speed in the neighborhood of 400 r.p.m. Other devices include pyrometers intended to provide information as to engine temperature conditions. However, these lack the features of the present invention as well as recording facilities enabling maintenance personnel or other persons concerned with the service life of the equipment to review conditions prevailing during any given run of the truck and to determine the magnitude or duration of the condition under check. Another common expedient likewise subject to many shortcomings is the use of automatic timing equipment providing a record of the time the truck is in actual movement, the length of any stop-over along the route, and the approximate location of these judged by comparison with other time periods of the run.

In view of the foregoing problems and deficiencies of prior devices pertaining to measures for assuring the most efficient handling and operation of motor vehicles, it is a primary object of the present invention to provide automatic monitoring apparatus which is substantially foolproof and not subject to the defects of prior devices seeking the same general beneficial results. To this end, the automatic monitor of this invention comprises a temperature transducer designed for expeditious attachment to a critical selected temperautre area of the engine. The output signal of this transducer is fed into a control circuit having its output arranged to drive the marking stylus of a power-driven recorder and functioning to advance sheet recording material past the stylus at a uniform rate. The strip of sheet material is appropriately graduated to indicate the temperature of the critical engine component under check. The visual graphic record so provided is located in a conveniently accessible viewing position for the driver and preferably has associated therewith automatic signaling means providing a positive warning signal to the driver if a dangerous operating condition goes unheeded by the driver.

The recorder continues in operation throughout the trip and the recording strip is removed at the end of the trip for inspection and approval by an appropriate interested party, as for example, the supervisor of driver personnel. The graphic record made by the recorder is so accurate and pictorial as to indicate truck stops made along the route including traffic signals and changes in grade. These facts are depicted sharply, accurately, and characteristically so that an observer knowing the route can identify stop lights and all pronounced grades, whether ascending or descending. In particular, the record indicates whether the driver shifted the gears on grades as necessary to avoid dangerous temperature conditions. The record will also indicate whether the temperature rose above a safe value, the duration of this condition, and in consequence, whether the engine should be sent to the shop for preventive maintenance servicing even though the injury sustained is not outwardly apparent through application of usual inspection techniques.

Accordingly, it is a primary object of the present invention to provide an automatic monitoring apparatus for use with internal combustion engines and incorporating means for making a graphic record of an engine operating condition so long as the engine is operating.

Another object of the invention is the provision of simple, rugged, inexpensive automatic temperature recording equipment adapted to be installed as a unit on vehicles and the like and having provision for making a permanent record of an operating condition of the engine with which it is associated.

Another object of the invention is the provision of a temperature transducer adapted to be attached to the exhaust manifold or the like of an internal combustion engine and functioning to actuate a recorder marking stylus to make a continuous graphic record of engine temperature conditions.

Another object of the invention is the provision of a monitoring temperature recorder for installation on internal combustion engines and featuring the production of a graphic temperature record in a convenient viewing position to the engine operator, and including automatic signal means which is energized automatically to warn the operator if he fails to take corrective steps timely.

These and other more specific objects will appear upon reading the following specification and claims and upon considering in connection therewith the attached drawing to which they relate.

Referring now to the drawing in which a preferred embodiment of the invention is illustrated.

FIGURE 1 is a generally schematic view showing the automatic monitor of this invention installed in a typical operating environment;

FIGURE 2 is a schematic wiring diagram of the control circuit for the monitor; and FIGURE 3 shows a pair of typical recorder tapes arranged in side-by-side relation and showing typical temperature results over the same run, the upper strip indicating lack of attention by the driver operator to shift gears or take other proper corrective action, and the lower strip showing proper driver response to the information provided by the monitoring apparatus.

Referring more particularly to FIGURES 1 and 2 there is shown a preferred embodiment of the invention installed on a cargo truck generally indicated at 10 and having a propelling engine 11 connected in known manner to the vehicle driving wheels. The automatic monitoring device includes a temperature transducer 12 here shown as mounted in the engine exhaust manifold 13 and the output of which is supplied to a control circuit housed in a casing 15. The output signal from the control circuit passes through suitable flexible cabling to a graphic recorder 16 shown as mounted on the dashboard 17 of the vehicle in a convenient viewing position for the driver seated behind steering wheel 18. The power supply for the monitoring equipment is conveniently supplied from any suitable source, such as the usual storage battery 20 customarily present on the truck to supply electrical needs of the vehicle.

A suitable control and power supply circuit for the entire monitoring apparatus is best shown in FIGURE 2. Owing to the desirability of having a reliable low-cost accurate timing motor for advancing recording strip 22 past the end of the marking stylus 23 of recorder 16, it is desirable to provide a suitable power converter for converting the direct current from the battery 20 to an A.C. voltage of approximately 115 volts. The power converter may be of any suitable type, the transistorized automatically reversing circuit designated generally 24 being suitable for this purpose. This circuit includes a step-up transformer 25 having two tapped primary windings 26, 27 and a single secondary winding 28, the latter being connected through suitable connections 29 to recorder 16. Primary coils 26, 27 are connected by lead wires in the manner shown through power supply leads 30 to battery 20. Leads 30 extend through protective fuses 31 and a manually controlled switch 32 to the primary coils.

In circuit with each primary coil is a suitable transistor 33, 34. One of the power supply leads is connected to the center tap of the two primary coils and one of these leads includes an unbalancing resistor 35 having a value effective to render the base of one transistor temporarily more negative than the other. In consequence, and as is well known to those skilled in the power converter art, first one transistor and then the other is rendered conductive for a brief instant. The resulting momentary pulsing or flow of current in first one and the other of the primary coils induces a stepped-up A.C. voltage of a predetermined characteristic frequency in secondary coil 28. This A.C. power output is supplied to a synchronous or other suitable uniform speed motor housed within the recorder to advance a strip of the recording medium 22 past the end of the stylus and recorder window 36.

Temperature transducer 12 includes an outer tubular jacket housing the transducer element proper and is securely supported centrally of a threaded bushing 38 having a non-circular head 39 to facilitate its assembly and disassembly with respect to a threaded opening in exhaust gas manifold 13. The transducer element housed within the inner end of the protective tube may be made of suitable wire such as a platinum alloy having a linear positive coefficient of resistance between approximately 30 degrees F. through 1800 degrees F. Transducer elements of this character are commercially available.

Transducer 12 is provided with leads 41 connecting the element proper in series circuit with one leg of a Wheatstone bridge designated generally 42. One pair of diagonally opposed terminals of this bridge is energized from battery 20 through lead wires 43 one of which preferably includes a factory adjustable resistor 44 convenient in calibrating and adjusting the circuit. The output signal obtained from bridge 42 is conveyed through conductors 45 to the driving or energizing coil for stylus 23 and typically comprising a sensitive dynamometer which responds to the strength of the signal received from the Wheatstone bridge and from transducer 12. In this connection it is pointed out that temperature rises sensed by transducer 12 unbalance the Wheatstone bridge in a manner to drive or rotate stylus 23 from its normal inactive position adjacent one edge of strip 22 toward the other lateral edge of this strip. Drops in the sensed temperature cause the stylus to move back toward its initial position by an amount corresponding to the drop in temperature.

Desirably, an automatic warning signal is provided for warning the operator either visually, audibly, or by both methods, if he fails to heed a dangerous temperature condition at the engine as evidenced by the position of the recorder stylus. As here shown by way of example, the warning means comprises a signal lamp 50 connected in circuit with the power supply to the recorder motor and with a sensitive contactor finger 51 positioned in the path of stylus 23. The stylus is made of conductive material and its pivoted end is connected in circuit with the power supply such that when the stylus reaches a position indicative of a dangerously high temperature condition, it contacts finger 51 and closes a circuit through signal means 50. As the temperature recedes from the dangerous condition, the circuit opens thereby de-energizing the signal means.

Referring now to FIGURE 3, there is shown two typical strips 60, 61 taken from recorder 16 and representing by the jagged trace lines 62, 63 actual temperature recordings made by stylus 23 on successive runs of the same vehicle over the same highway. Trace 62 on strip 60 shows the record made by a careless driver who failed to heed the information specially for him by the engine monitoring equipment or to shift his transmission by shifting lever 65 to the proper positions at different times. The lengthwise or direction of strip advance extends crosswise of the drawing and represents the time axis of the chart. The chart is divided crosswise of its direction of advance into a temperature scale of a suitable range.

Interpretation of the traces 62, 63 is a simple matter. For example, the steep temperature rise represented by portion A of trace 62 represents the engine temperature when starting from a cold condition. Declining portion B of the trace indicates that the vehicle was coasting on a downgrade before the engine had fully warmed from a cold start. The sharp rise indicated at C shows the vehicle was then climbing a rather steep grade during which the temperature rose from 375 degrees F. to nearly 1300 F. The jagged decline over the short range D shows the engine cooled slightly and that the vehicle was then coasting following which it was driven up another grade. The sharp peak represented by E shows that the engine was being mistreated probably due to efforts to negotiate a step climb without shifting the transmission down to the proper extent. In consequence of this disregard of the chart warnings by the driver the engine temperature rose to the harmful values of 1400 degrees F. Even if this condition existed for only a short interval, still serious injury could have resulted to the valves, the valve seats, and other critical components of the engine.

Referring now to the lower chart 61, it is pointed out that trace 63 represents the temperature conditions of the same engine driven over the same route by an observant driver keeping a watchful eye on the recorder chart and following the proper operating procedures. It will be noted that the same prominent downgrades and upgrades are easily identified in the two charts but that the latter chart differs significantly from chart 60 in two respects. In the first place, there are no striking temperature rises and falls but instead the temperature of the engine manifold tends to remain within a fairly narrow safe range throughout the major portion of the run. Secondly, the lower chart shows that the engine temperature was not permitted to rise more than a few degrees above 1200 degrees F. at any time which, for most engines, is considered a safe operating temperature. The driver turning in the lower chart 61 should be complimented by his supervisor for splendid observance of driving rules and of the warnings provided by the temperature recorder. The driver completing the run represented by chart 60 would have only a chart evidencing improper attention to the recorder and proper driving procedure. In fact, the latter chart should raise a serious question as to whether the vehicle should not be sent to the shop for servicing and a general engine overhaul to determine the extent of the damage done during operation at excessive temperatures.

From the foregoing it will be appreciated that this invention provides a positive, foolproof, tamperproof record representing actual temperature conditions at an appropriate critical position on an engine throughout a given run. The record so made can be filled as part of a permanent log for the vehicle and evidencing the driving ability, attention to duty of the driver in charge. If desired, the recorder may be provided with a suitable lock accessible only to personnel authorized to service the recorder and to remove the record at the end of the run.

While the particular automatic engine monitoring apparatus herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:

1. That method of operating a heavy duty engine propelled cargo hauling vehicle of the type having a multiple stage gear transmission which method comprises, manually regulating the supply of fuel to the engine to operate the engine at a substantially constant optimum speed, making a continuous record of the engine exhaust manifold temperature, displaying said temperature record for convenient reading by the vehicle driver while engaged in driving, and using the last recorded temperature readings as a guide to shift the transmission gears to drive the vehicle selectively faster or slower as necessary to prevent the exhaust manifold temperature from exceeding a predetermined maximum temperature while continuing to operate the engine at said substantially constant optimum speed.

2. That method of operating a heavy duty engine propelled cargo hauling vehicle of the type having a multiple stage gear transmission which method comprises, manually regulating the supply of fuel to the engine to operate the engine at a substantially constant optimum speed, making a continuous record of the engine exhaust manifold temperature, displaying said temperature record for convenient reading by the vehicle driver while engaged in driving, and shifting said transmission gears as necessary to hold the exhaust manifold temperature below a predetermined peak value while maintaining engine speed substantially at said constant optimum speed whereby the vehicle driver is enabled to travel a maximum distance in a minimum of time without risk of overheating the engine at any time.

3. That improved method of operating a cross-country cargo vehicle of the type having a multiple stage gear transmission system to transport cargo a maximum distance in a minimum of time while operating the vehicle engine at its optimum speed so long as there is need for power therefrom and particularly while traveling across hilly and mountainous terrain, said method comprising, manually regulating the fuel supply to the engine to maintain the same at a substantially constant optimum power output speed while the vehicle is underway, continually recording the engine exhaust manifold temperature and displaying the result to the driver in readily readable form, and shifting the gears of said transmission system to increase and to decrease the driving gear ratio while the vehicle is climbing a hill as necessary to keep the observed exhaust manifold temperature close to but below a predetermined maximum temperature known to be harmful to the engine.

4. That method of monitoring and policing the driving habits of cross-country cargo vehicle drivers to obtain efficient use of the vehicle equipment without risk of abusive use of the equipment on hilly and mountainous terrain, said equipment being of the type employing multiple stage gear transmission system having numerous forward drive gear ratios, said method comprising, continuously electrically sensing the exhaust manifold temperature so long as the engine is opearting, graphically recording the temperature readings on a calibrated chart while said chart is traveling at a predetermined rate, displaying the current chart readings to the driver in readily readable form while he is engaged in driving, and utilizing the displayed temperature recordings as a guide in shifting gear ratios to maintain maximum vehicle speed with the engine operating at a substantially constant optimum power output speed but without allowing the observed engine exhaust manifold temperature to exceed a predetermined safe value, and removing the portion of the temperature chart at the end of a given trip for review to establish that the trip was made in accordance with prescribed operating conditions governing the use of the vehicle.

5. That improvement in apparatus for monitoring the operation of an engine-driven cargo-carrying vehicle of the type having a multiple-stage transmission provided with means for varying the input-to-output speed ratio thereof and which monitoring apparatus is adapted to be utilized by the vehicle operator to minimize and discourage abusive handling of the vehicle engine and to provide a permanent record of vehicle operation; said apparatus comprising an electric temperature transducer adapted to be mounted in intimate heat exchange with the exhaust gases within the exhaust gas manifold of the engine, graphic recorder means mountable within the vehicle operator's compartment and having means for advancing sheet record material past marking stylus means positioned for convenient reading by said operator, power converter means for driving said graphic recorder means and adapted to be energized by the direct current power source for the vehicle engine ignition system, said power converter means including means for converting direct current to alternating current at a substantially stepped-up voltage, and means for connecting the input thereof to the engine direct current power supply and its alternating output to said graphic recorder means, control circuit means interconnecting said transducer and said graphic recorder means and responsive to varying signals originating at said temperature transducer indicative of changing temperature conditions and effective to move said stylus and make a recording on said sheet material thereby to keep the vehicle operator informed of engine temperature and of the need for varying the input-to-output speed ratio of said engine transmission as required to hold the engine temperature as displayed on said graphic recorder means close to but not in excess of a predetermined safe engine operating temperature.

6. That improved apparatus defined in claim 5 characterized in the provision of signal means connected in said control circuit means and responsive to a temperature above said safe engine operating temperature to signal the vehicle operator automatically and simultaneously that said temperature transducer reaches a predetermined temperature indicative of overloading of the engine thereby to inform the vehicle operator of the need for varying the transmission input-to-output speed ratio to a lower output speed.

References Cited by the Examiner

UNITED STATES PATENTS

| | | | |
|---|---|---|---|
| 903,090 | 11/1908 | Hopkins | 73—346 |
| 1,205,379 | 11/1916 | Nelson | 73—346 |
| 1,224,385 | 5/1917 | Kennedy | 73—343.5 |
| 1,660,886 | 2/1928 | Randall. | |
| 2,102,030 | 12/1937 | Quereau | 73—343.5 |
| 2,633,404 | 3/1953 | Hathaway | 346—3 X |
| 2,721,890 | 10/1955 | Malick. | |
| 2,729,104 | 1/1956 | Shuck et al. | 73—391 |
| 3,035,443 | 5/1962 | Gray | 73—343.5 |
| 3,092,999 | 6/1963 | Eickmann | 73—363.7 |

LOUIS R. PRINCE, *Primary Examiner.*

I. LISANN, *Examiner.*

R. F. BEERS, S. H. BAZERMAN, F. SHOON,
*Assistant Examiners.*